US009253103B2

(12) United States Patent
Strasman et al.

(10) Patent No.: US 9,253,103 B2
(45) Date of Patent: *Feb. 2, 2016

(54) MANAGING STREAMING BANDWIDTH FOR MULTIPLE CLIENTS

(75) Inventors: Nery Strasman, Ramat Gan (IL); Biren Sood, Los Gatos, CA (US)

(73) Assignee: Vasona Networks Inc., Santa Clara, CA (US)

( * ) Notice: Subject to any disclaimer, the term of this patent is extended or adjusted under 35 U.S.C. 154(b) by 515 days.

This patent is subject to a terminal disclaimer.

(21) Appl. No.: 13/305,753

(22) Filed: Nov. 29, 2011

(65) Prior Publication Data
US 2013/0138828 A1 May 30, 2013

Related U.S. Application Data

(63) Continuation of application No. 13/129,399, filed on Feb. 1, 2012.

(51) Int. Cl.
G06F 15/16 (2006.01)
H04L 12/825 (2013.01)
H04N 21/2385 (2011.01)
H04N 21/24 (2011.01)
H04N 21/2662 (2011.01)
H04N 21/845 (2011.01)
H04L 29/06 (2006.01)

(52) U.S. Cl.
CPC ............. *H04L 47/25* (2013.01); *H04L 65/602* (2013.01); *H04N 21/2385* (2013.01); *H04N 21/2402* (2013.01); *H04N 21/2662* (2013.01); *H04N 21/8456* (2013.01)

(58) Field of Classification Search
None
See application file for complete search history.

(56) References Cited

U.S. PATENT DOCUMENTS

| 6,385,673 | B1 | | 5/2002 | DeMoney | |
| 6,697,378 | B1 | | 2/2004 | Patel | |
| 7,333,431 | B2 | * | 2/2008 | Wen | .................... H04L 12/5602 370/230.1 |
| 8,000,475 | B1 | * | 8/2011 | Guman | .......................... 380/212 |
| 8,161,158 | B2 | * | 4/2012 | Curcio | ................. H04W 28/18 709/226 |
| 8,205,004 | B1 | | 6/2012 | Kaufman et al. | |
| 8,341,255 | B2 | * | 12/2012 | Gopalakrishnan | .. H04L 65/4084 709/200 |
| 8,352,992 | B1 | * | 1/2013 | Patti | ................. H04N 21/23439 725/105 |

(Continued)

FOREIGN PATENT DOCUMENTS

WO WO/2006/116483 11/2006

OTHER PUBLICATIONS

XP002617719; Mar. 23, 2009; Alex Zambelli; IIS Streaming Technical Overview.

Primary Examiner — Jason K. Gee
Assistant Examiner — Olanrewaju Bucknor
(74) Attorney, Agent, or Firm — Reches Patents

(57) ABSTRACT

A method, system and a computer program product. The method may include: allocating or receiving allocated bit rates to a plurality of streaming media flows, each streaming media flow comprises a plurality of chunks and is expected to flow over a last mile channel that is bandwidth limited; receiving a plurality of chunk requests from clients that are hosted on user devices, each chunk request indicates a requested bit rate for streaming a media chunk that belongs to the streaming media flow; changing at least one chunk request to comply with an allocated bit rate, if the requested bit rate does not comply with the allocated bit rate, to provide at least one new chunk request; and sending the at least one new chunk request to a media streamer that is expected to stream the streaming media flow to the user device.

62 Claims, 6 Drawing Sheets

(56) References Cited

U.S. PATENT DOCUMENTS

| | | | |
|---|---|---|---|
| 8,621,044 B2* | 12/2013 | Sood et al. .................... 709/219 |
| 8,683,013 B2* | 3/2014 | Major ................ H04N 21/2225 |
| | | 375/377 |
| 8,717,890 B2* | 5/2014 | Kovvali .................. H04L 47/25 |
| | | 370/229 |
| 2003/0067872 A1* | 4/2003 | Harrell et al. ................. 370/229 |
| 2004/0098748 A1* | 5/2004 | Bo ..................... H04N 7/17336 |
| | | 725/105 |
| 2004/0203825 A1 | 10/2004 | Daniel et al. |
| 2005/0036496 A1* | 2/2005 | Tang ........................ 370/395.21 |
| 2005/0066063 A1* | 3/2005 | Grigorovitch ......... H04N 7/163 |
| | | 710/1 |
| 2005/0114538 A1 | 5/2005 | Rose |
| 2005/0148314 A1 | 7/2005 | Taglienti et al. |
| 2005/0185635 A1* | 8/2005 | Nagendra .................... 370/352 |
| 2005/0204046 A1 | 9/2005 | Watanabe |
| 2007/0044133 A1* | 2/2007 | Hodecker .................... 725/117 |
| 2008/0133766 A1* | 6/2008 | Luo .............................. 709/231 |
| 2008/0212480 A1 | 9/2008 | Shimonishi |
| 2009/0187673 A1* | 7/2009 | Ramjee et al. ................ 709/247 |
| 2009/0327079 A1 | 12/2009 | Parker et al. |
| 2010/0034089 A1 | 2/2010 | Kovvali et al. |
| 2010/0074275 A1 | 3/2010 | Sahai |
| 2010/0080290 A1 | 4/2010 | Mehrotra |
| 2010/0131659 A1 | 5/2010 | Narayana et al. |
| 2010/0131671 A1* | 5/2010 | Kohli et al. ................... 709/233 |
| 2010/0151899 A1 | 6/2010 | Lekutai |
| 2010/0195602 A1 | 8/2010 | Kovvali et al. |
| 2010/0235438 A1* | 9/2010 | Narayanan et al. .......... 709/203 |
| 2010/0235472 A1* | 9/2010 | Sood et al. .................... 709/219 |
| 2011/0032898 A1 | 2/2011 | Kazmi et al. |
| 2011/0082924 A1 | 4/2011 | Gopalakrishnan |
| 2011/0145726 A1 | 6/2011 | Wei et al. |
| 2011/0197239 A1 | 8/2011 | Schlack |
| 2012/0039191 A1 | 2/2012 | Foster et al. |
| 2012/0052866 A1 | 3/2012 | Froehlich et al. |
| 2012/0087260 A1 | 4/2012 | Devarapalli et al. |
| 2012/0311174 A1* | 12/2012 | Bichot et al. ................. 709/231 |
| 2013/0016620 A1 | 1/2013 | Den Hartog et al. |
| 2013/0163428 A1 | 6/2013 | Lee et al. |

\* cited by examiner

MANAGING STREAMING BANDWIDTH FOR MULTIPLE CLIENTS

RELATED APPLICATIONS

This application claims is a continuation of U.S. patent application Ser. No. 13/129,399 filed on May 16, 2011, which is a national phase application of PCT/IB2011/051501 (and entitled MANAGING STREAMING BANDWIDTH FOR MULTIPLE CLIENTS) which claims priority from U.S. provisional patent Ser. No. 61/321,891, filing date Apr. 8, 2010 (and entitled MANAGING STREAMING BANDWIDTH FOR MULTIPLE CLIENTS), all applications are incorporated in their entirety herein by reference.

BACKGROUND OF THE INVENTION

Video streaming is an important application over the Internet. The number of available streams, servers and users is rapidly growing and is the leading consumer of bandwidth.

"Classical" Streaming

Streaming in its original form was performed by transmitting a stream from the server to a client with little feedback. Feedback was only provided if the client did not receive data within a given time. The feedback could be done by use or lack of Acknowledgement (Ack) messages if the stream was sent over the TCP protocol or by resending requests for the stream by the client. In many cases the protocol used was RTSP.

Adaptive Bit Rate with "Classical" Streaming

Since the server and the client do not have clear visibility of the medium between them, it is practically impossible for the server to know if a stream with one specific bit-rate could reach the client or whether bandwidth congestion on the way would block the client from receiving it. Therefore, servers adopted different adaptive bit rate methods. In all cases, the servers maintain a few versions of the stream, each one encoded in a different bit-rate. In the general case, if a segment of a stream with a specific bit rate did not reach the client, the server would try to retransmit the stream with a lower bit rate.

Lower bit rates can be achieved by lowering spatial resolution, number of frames per second or simply applying stronger compression to the stream. In cases where the clients received all the transmitted segments, the server could revert to higher bit rate versions of the stream and transmit those. In these cases, the device which decided which bit rates to use was the server.

HTTP Streaming

For different reasons including firewall restrictions and compatibility between different servers and clients, the market has generally reverted (or is in the process of reverting) to HTTP streaming. When performing HTTP streaming the client requests a file download over HTTP. In this case, the client may request only parts of a file or all of it. If the client desires, it may stop the downloading of the file and ask the server to download a different file. To sum this up, in the simplest sense, HTTP streaming involves a file download from the server to the client. This type of streaming is often known as Progressive Download (PD).

Adaptive Bit Rate (ABR) with HTTP Streaming

Adaptive bit rate with HTTP streaming is a relatively new technology. When it is used, the server first saves a few different versions of the video clip. The difference is usually a bitrate difference but there might also be resolution or other differences between the versions. The different versions are chopped into small segments usually known as fragments or chunks (these words are used interchangeably in this application) which have a playback duration of a few seconds. The server sends the client a manifest file. The manifest file informs the client which versions are available, the duration of the fragments and where the client can find the different fragments.

The Client then Asks the Server to Transmit Specific Fragments of the Stream

ABR HTTP streaming can also be used with live streaming. In this case, the manifest file is constantly updated and sent to the client. In some ABR cases, each bit rate chunk is stored as a single file. In other cases, each file holds the entire stream with one specific bit rate and different chunks are simply different segments of the file. Other implementations may include only one file which is segmented by bit rates and chunks.

As in classical streaming, the client and server do not have any information regarding the medium between them. Therefore, a mechanism is needed here also to determine the stream's bit rate. In this case it is the client which makes the decision. Algorithms implemented in the client decide which bit rate chunk to request from the server. The decision may be influenced by several factors such as available buffer space, processing power of the client and bandwidth considerations such as: if the previously requested chunk was not received (probably because of network congestion)—request a lower bit rate fragment next time. Occasionally the client may request a chunk with a bit rate which is higher than the last received chunk.

The Problem

Different clients often share the same resources often referred to as the Last Mile channel. For example, cellular/mobile devices may share the same cell in newer systems or the same frequency within a cell in older systems. In cable networks, clients may share the same QAM channel. The last mile channel in all networks is limited to a specific bandwidth. Often, this bandwidth may not be enough to allow all bit rates demanded by all services transmitted to the downstream devices. In order to reduce data loss some management of the bandwidth is needed. However, with streaming, management is not available. The only methods the network operator can use are to set priorities to different devices or services and to limit bandwidth for devices or services. Both solutions are not good. When setting priorities, one service or device can consume extremely large amounts of bandwidth and completely starve other clients. Limiting bit rates poses other problems such as leaving unused bandwidth on the pipe or setting the limit so low that services cannot be delivered at all or are delivered with many interruptions. The network operator can't manage the last mile channel efficiently because it is not aware of the transactions between the servers and clients. Following are two examples of these inefficiencies but there are many more. For the sake of simplicity, in the examples the assumption is that only streaming sessions occupy the last mile channel pipe.

Unused Bandwidth

Assume that all the bandwidth is utilized and each device receives chunks as requested. Now assume that one device ceases to request the service and drops off. Bandwidth which was allocated for this device is now free but other devices are not aware of this and therefore none of them request a chunk with higher bit rate. As a result the bandwidth remains free and unused until a device requests higher bit rate. This means that at least some of the devices could have received chunks at higher bit rate and therefore better quality but this didn't happen.

Bandwidth Waste

Assume that all the bandwidth is utilized and all devices receive chunks as requested. Now assume that one device attempts to receive a chunk at a higher bit rate because it doesn't know that all the bandwidth is utilized. It requests a chunk at a higher bit rate. The server attempts to transmit the requested chunk. Now there is congestion on the last mile channel and data will be discarded. The data discarded may be data that serves any one of the devices. Statistically, more than one service will be affected. This may include the device which initiated the high bit rate request. The affected devices will not receive the chunks they requested. All these devices will experience losses in the TCP layer and would therefore send resend requests. Since the data requests are performed in the HTTP layer and are made for fragments with durations of a few seconds, this situation can't be corrected by TCP or HTTP layer mechanisms for the duration of the fragments. In effect, much data will be discarded.

SUMMARY OF THE INVENTION

According to various embodiments of the invention a method for controlling streaming media flows is provided, the method may include: allocating or receiving allocated bit rates to a plurality of streaming media flows, each streaming media flow may include a plurality of chunks and is expected to flow over a last mile channel that is bandwidth limited; receiving a plurality of chunk requests from clients that are hosted on user devices, each chunk request indicates a requested bit rate for streaming a media chunk that belongs to the streaming media flow; changing at least one chunk request to comply with an allocated bit rate, if the requested bit rate does not comply with the allocated bit rate, to provide at least one new chunk request; and sending the at least one new chunk request to a media streamer that is expected to stream the streaming media flow to the user device.

The method may include notifying a client that is associated with a new chunk request about the requested bit rate.

The method may include concealing from the client that is associated with a new chunk request the changing of the requested bit rate.

The media streamer may be unaware of a stage of the last mile channel.

The method may include: receiving an acknowledgement message from a client, the acknowledgement message is indicative of a reception of a media chunk; and delaying the transmission of the acknowledgement message, wherein the delay is responsive to an allocated bit rate associated with the client.

The method may include: receiving an acknowledgement message from a client, the acknowledgement message is indicative of a reception of the media chunk; determining whether to delay the transmission of the acknowledgement message; and delaying the transmission of the acknowledgement request based on the determining; wherein the delay is responsive to an allocated bit rate.

The method may include allocating the allocated bit rate to each of the streaming media flows by a system that is coupled to last mile channel.

The method may include allocating the allocated bit rate to the streaming media flows by collaboration between the clients.

The method may include allocating the allocated bit rates to the streaming media flows by utilizing client proxies on a system, the client proxies proxy the clients.

The method may include allocating the allocated bit rates based upon quality levels of the streaming media streams.

The method may include: unchanging file requests that are associated with a first type of streaming media flows; changing chunk requests to comply with allocated bit rates if the chunk requests are associated with a second type of streaming media flows and if requested bit rates do not comply with the allocated bit rates to provide new chunk requests; and sending unchanged chunk requests and new chunk requests to at least one media streamer that is expected to stream the streaming media flows to the user devices.

The first type of streaming media flows is a progressive download.

The second type of streaming media flows is an adaptive bit rate flow.

The method may include allocating the allocated bit rate to the streaming media flows by collaboration between the multiple clients.

The method may include allocating the allocated bit rates to the streaming media flows by utilizing client proxies on a system that is coupled to the last mile channel.

The method may include enforcing different bit rate control policies to different types of streaming media flows.

The last mile channel is a wired channel.

The last mile channel is a wireless channel.

The allocated bit rate of the allocated bit rates is a predetermined portion of a maximal allowable bit rate of the streaming media flow.

The allocated bit rate of the allocated bit rates is a percentage of a maximal allowable bit rate of the streaming media flow.

The method may include allocating the allocated bit rates to the streaming media flows.

The method may include receiving the allocated bit rates to the streaming media flows.

According to various embodiments of the invention a system is provided and may include: an input interface arranged to receive a plurality of chunk requests from clients that are hosted on user devices, each chunk request indicates a requested bit rate for streaming a media chunk that belongs to the streaming media flow; a processing module that may be arranged to: allocate or receive allocated bit rates to a plurality of streaming media flows, each streaming media flow may include a plurality of chunks and is expected to flow over a last mile channel that is bandwidth limited; change at least one chunk request to comply with an allocated bit rate, if the requested bit rate does not comply with the allocated bit rate, to provide at least one new chunk request; and an output interface arranged to send the at least one new chunk request to a media streamer that is expected to stream the streaming media flow to the user device.

The processing module may be arranged to notify a client that is associated with a new chunk request about the requested bit rate.

The processing module may be arranged to conceal from the client that is associated with a new chunk request the changing of the requested bit rate.

The media streamer is unaware of a stage of the last mile channel.

The input interface may be arranged to receive an acknowledgement message from a client, the acknowledgement message is indicative of a reception of a media chunk; and wherein an output interface of the system may be arranged to delay the transmission of the acknowledgement message, wherein the delay is responsive to an allocated bit rate associated with the client.

The input interface may be arranged to receive an acknowledgement message from a client, the acknowledgement message is indicative of a reception of the media chunk; wherein the processing module may be arranged to determine whether to delay the transmission of the acknowledgement message; and wherein an output interface of the system may be arranged to delay the transmission of the acknowledgement request based on the determining; wherein the delay is responsive to an allocated bit rate.

The processing module may be arranged to allocate the allocated bit rate to each of the streaming media flows by a system that is coupled to last mile channel.

The processing module may be arranged to allocate the allocated bit rate to the streaming media flows by collaboration between the clients.

The processing module may be arranged to allocate the allocated bit rates to the streaming media flows by utilizing client proxies on a system, the client proxies proxy the clients.

The processing module may be arranged to allocate the allocated bit rates based upon quality levels of the streaming media streams.

The processing module may be arranged to not change file requests that are associated with a first type of streaming media flows; change chunk requests to comply with allocated bit rates if the chunk requests are associated with a second type of streaming media flows and if requested bit rates do not comply with the allocated bit rates to provide new chunk requests; and wherein an output interface of the system may be arranged to send unchanged chunk requests and new chunk requests to at least one media streamer that may be expected to stream the streaming media flows to the user devices.

The first type of streaming media flows may be a progressive download.

The second type of streaming media flows may be an adaptive bit rate flow.

The processing module may be arranged to allocate the allocated bit rate to the streaming media flows by collaboration between the plurality of clients.

The processing module may be arranged to allocate the allocated bit rates to the streaming media flows by utilizing client proxies on a system that may be coupled to the last mile channel.

The processing module may be arranged to enforce different bit rate control policies to different types of streaming media flows.

The last mile channel may be a wired channel.

The mile channel may be a wireless channel.

The allocated bit rate may be a predetermined portion of a maximal allowable bit rate of the streaming media flow.

The allocated bit rate may be a percentage of a maximal allowable bit rate of the streaming media flow.

The processing module may be arranged to allocate the allocated bit rates to the streaming media flows.

The processing module may be arranged to receive the allocated bit rates to the streaming media flows.

According to an embodiment of the invention a computer program product may be provided that may include a non-transitory computer readable medium that may store instructions for: allocating or receiving allocated bit rates to a plurality of streaming media flows, each streaming media flow may include a plurality of chunks and is expected to flow over a last mile channel that is bandwidth limited; receiving a plurality of chunk requests from clients that are hosted on user devices, each chunk request indicates a requested bit rate for streaming a media chunk that belongs to the streaming media flow; changing at least one chunk request to comply with an allocated bit rate, if the requested bit rate does not comply with the allocated bit rate, to provide at least one new chunk request; and sending the at least one new chunk request to a media streamer that may be expected to stream the streaming media flow to the user device.

The non-transitory computer readable medium may store instructions for notifying a client that may be associated with a new chunk request about the requested bit rate.

The non-transitory computer readable medium may store instructions for concealing from the client that may be associated with a new chunk request the changing of the requested bit rate.

The media streamer may be unaware of a stage of the last mile channel.

The non-transitory computer readable medium may store instructions for receiving an acknowledgement message from a client, the acknowledgement message may be indicative of a reception of a media chunk and delaying the transmission of the acknowledgement message, wherein the delay may be responsive to an allocated bit rate associated with the client.

The non-transitory computer readable medium may store instructions for receiving an acknowledgement message from a client, the acknowledgement message may be indicative of a reception of the media chunk; determining whether to delay the transmission of the acknowledgement message; and delaying the transmission of the acknowledgement request based on the determining; wherein the delay may be responsive to an allocated bit rate.

The non-transitory computer readable medium may store instructions for allocating the allocated bit rate to each of the streaming media flows by a system that may be coupled to last mile channel.

The non-transitory computer readable medium may store instructions for allocating the allocated bit rates to the streaming media flows by a collaboration between the clients.

The non-transitory computer readable medium may store instructions for allocating the allocated bit rates to the streaming media flows by utilizing client proxies on a system, the client proxies proxy the clients.

The non-transitory computer readable medium may store instructions for allocating the allocated bit rates based upon quality levels of the streaming media streams.

The non-transitory computer readable medium may store instructions for: not changing file requests that are associated with a first type of streaming media flows; changing chunk requests to comply with allocated bit rates if the chunk requests are associated with a second type of streaming media flows and if requested bit rates do not comply with the allocated bit rates to provide new chunk requests; and sending unchanged chunk requests and new chunk requests to at least one media streamer that may be expected to stream the streaming media flows to the user devices.

The first type of streaming media flows may be a progressive download.

The second type of streaming media flows may be an adaptive bit rate flow.

The non-transitory computer readable medium may store instructions for allocating the allocated bit rates to the streaming media flows by collaboration between the plurality of clients.

The non-transitory computer readable medium may store instructions for allocating the allocated bit rates to the streaming media flows by utilizing client proxies on a system that may be coupled to the last mile channel.

The non-transitory computer readable medium may store instructions for enforcing different bit rate control policies to different types of streaming media flows.

The last mile channel may be a wired channel.

The last mile channel may be a wireless channel.

The non-transitory computer readable medium may store instructions for determining an allocated bit rate of the allocated bit rates as a predetermined portion of a maximal allowable bit rate of the streaming media flow.

An allocated bit rate of the allocated bit rates as a percentage of a maximal allowable bit rate of the streaming media flow.

The non-transitory computer readable medium may store instructions for allocating the allocated bit rates to the streaming media flows.

The non-transitory computer readable medium may store instructions for receiving the allocated bit rate to the streaming media flow.

According to an embodiment of the invention a method may be provided and may include: receiving chunk requests from clients of user devices coupled to a last mile channel; inspecting all traffic expected on the last mile channel, the inspecting may include: assessing required bit rate needed to satisfy the chunk requests; allocating bandwidth based on the inspecting; generating new chunk requests responsive to the allocating of bandwidth; and transmitting the new chunk requests to streaming servers.

The allocating may be further responsive to policy considerations.

The allocating may be further responsive to at least one out of: video quality, user priority, operator priority, service priority and billing considerations.

The method may include making a bit rate decision collaboratively.

According to an embodiment of the invention a computer program product is provided and may include a non-transitory computer readable medium that may store instructions for: receiving chunk requests from clients of user devices coupled to a last mile channel; inspecting all traffic expected on the last mile channel, the inspecting may include: assessing required bit rate needed to satisfy the chunk requests; allocating bandwidth based on the inspecting; generating new chunk requests responsive to the allocating of bandwidth; and transmitting the new chunk requests to streaming servers.

The non-transitory computer readable medium may store instructions for allocating bit rates that may be further responsive to policy considerations.

The non-transitory computer readable medium may store instructions for allocating bit rates that may be further responsive to at least one out of: video quality, user priority, operator priority, service priority and billing considerations.

The non-transitory computer readable medium may store instructions for making a bit rate decision collaboratively.

According to an embodiment of the invention a method for controlling streaming media flows is provided, the method may include: allocating or receiving allocated bit rates to streaming media flows and to additional flows that differ from streaming media flows, each streaming media flow may include a plurality of chunks and each media chunk may include a plurality of media packets, wherein the additional flows and the streaming media flows are expected to flow over a last mile channel that may be bandwidth limited; receiving packets that were either transmitted over the last mile channel or are expected to be transmitted over the last mile channel; determining whether each packet may be a streaming media packet, a chunk request, an acknowledgement message or another packet; if the packet is a chunk request: determining whether to alter a bit rate requested by a chunk request; selectively altering the bit rate requested by the chunk request to provide a new chunk request, wherein the selectively altering is response to an allocated bit rate that is allocated to the streaming media flow associated with the chunk request; and transmitting the new chunk request to a media streamer that is expected to stream the streaming media flow associated with the chunk request; if the packet is a streaming media packet, transmitting the streaming media packet to a client and updating a status of the last mile channel; and if the packet is an acknowledgement message indicative of a reception of a media packet by a client: determining a timing of a transmission of the acknowledgement message to a media streamer, the determination is to a bit rate allocated to a streaming media flow that may include the media packet; and transmitting the acknowledgement message to a media streamer based on the determination of the timing of the transmission.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof may best be understood by reference to the following detailed description when read with the accompanying drawings in which:

Figure 1:
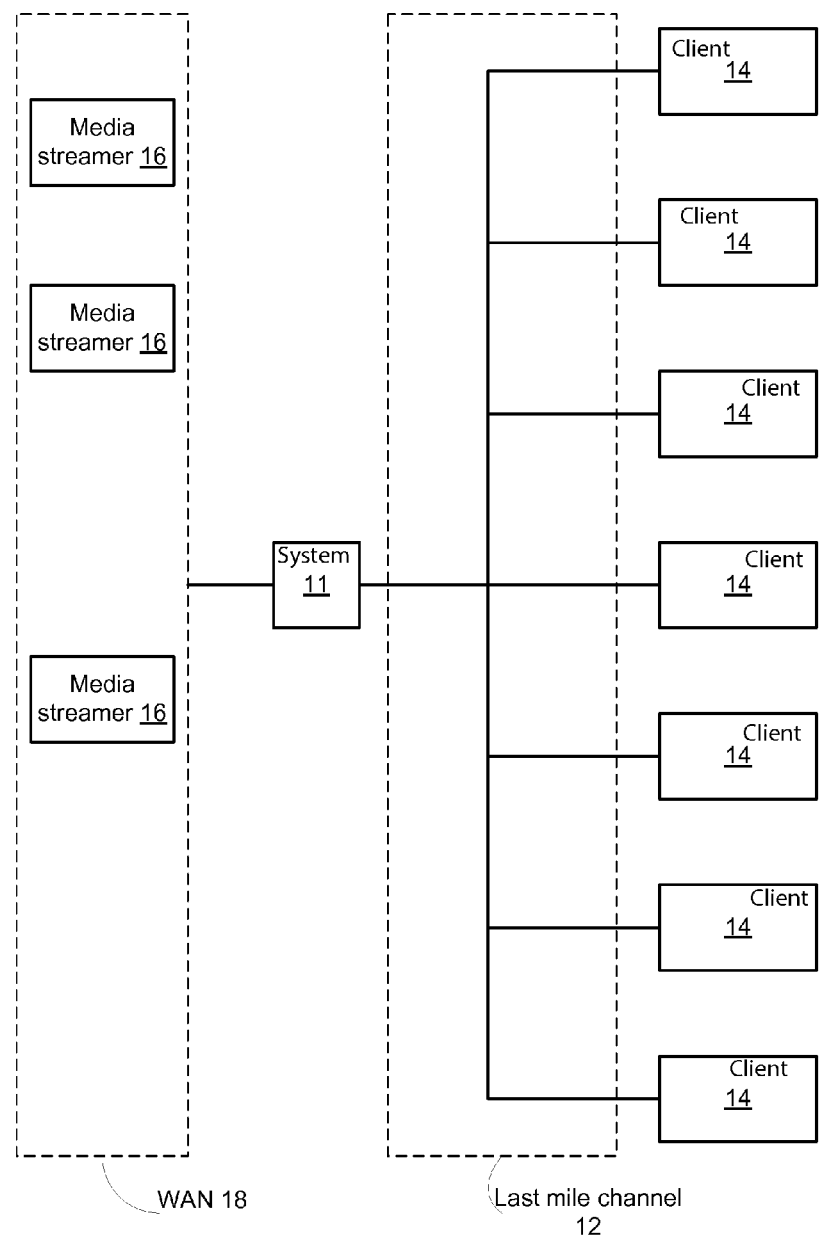
FIG. 1 illustrates a system and its environment according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "chunk request" is a request to receive a media chunk of a streaming media flow. A streaming media flow is a media flow that is configured to be streamed by a media streamer. The chunk request may include a chunk identifier and a bit rate (bit rate) request that indicated the desired bit rate of the requested chunk. The requested bit rate can be defined in an explicit manner (for example—the value of the requested bit rate can be included in the chunk request) or implicitly (for example—the chunk identifier may point to a certain version of the media chunk—of a known bit rate). The chunk request can include a URL that is specific to a specific segment and a specific bit rate.

The term "media source" can mean an entity that provides media chunks to the system or to clients. The media source can receive the media chunks from another entity, can generate the media chunks himself, can generate various version of media chunks that differ from each other by their bit rate, can receive various versions of the media chunks from another entity ad the like. The media source can be a media server.

A media source that is capable of streaming one or more streaming media flows is referred to as a media streamer.

The term "last mile" may have its regular meaning. For example, it may have the meaning defined by www.wikipedia.org: "The "last mile" or "last kilometer" is the last mile of delivering connectivity from a communications provider to a customer. The phrase is therefore often used by the telecommunications and cable television industries. The actual distance of this leg may be considerably more than a mile, especially in rural areas. It is typically seen as an expensive challenge because "fanning out" wires and cables is a considerable physical undertaking. Because the last mile of a network to the user is also the first mile from the user to the world in regards to sending data (such as uploading), the term "first mile" is sometimes used.

According to an embodiment of the invention a system is provided. It is connected between the Internet or any Wide Area Network (WAN) and the last mile channel. For convenience of explanation the following description will refer to a last mile channel although it is applicable to other types of infrastructures. The last mile channel can include links, communication lines or any kind of bandwidth limited resources.

According to various embodiments of the invention the allocation of bit rates can be responsive to at least one parameter out of media stream priority, client priority, video quality, service priority, priority assigned to different types of streaming, policies responsive to the timing of streaming, to the type of transmission (wired, wireless), and the like. For example—client of higher priority may be allocated more bit rate.

According to an embodiment of the invention the bit rate allocation is executed by a system that is coupled to the last mile channel. It is noted that the bit rate allocation can be executed by a plurality of systems—in a distributed, centralized or even hierarchical manner. A hierarchical system can include a top tier system arranged to allocate bit rates over a first bandwidth limited medium, while the lowest tier system can be arranged to determine the bit rate allocation over a plurality of last mile channels that may receive content (directly or indirectly) from the first bandwidth limited medium. Yet for another example—the hierarchical system can include a top tier system arranged to allocate bit rates over the last mile channel, while the lowest tier system can be arranged to determine the bit rate allocation over channels that are fed from the last mile channel—such as customer premises gateways and the like.

FIG. 1 illustrates a system 11 that is connected between a WAN (such as the Internet), last mile channel 12 and user devices that host clients 14.

According to various embodiments of the invention user devices host clients. The clients and, additionally or alternatively, the system may participate in the bit rate control of the bandwidth limited resource. It is noted that end user devices and the media streamer may not be aware of the state of the bandwidth limited resource and thus may request or allocate bit rates in sub-optimal manner, as illustrated for example in the background section of this patent application.

The system 11 may reside before a bandwidth limiting resource, or otherwise can be able to participate in the bit rate control of the bandwidth limited resource. The system may be a router, an aggregator, a switch, a controller, or a combination thereof. The system can include hardware, software firmware or a combination thereof.

According to an embodiment of the invention at least a part (for example—at least a majority) of the bit rate control is executed by the clients and these clients may be proxied at the system. Accordingly, the clients may collaborate to apply bit rate control and especially may apply a distributed media access control scheme that is mainly based upon an exchange of information between the different clients.

A client can send a chunk request to other clients and once approved by other clients—the system can pass to the media streamer the chunk request. The clients can collaborate while taking into account client priorities, request priorities, quality of service issues, pervious chunk requests that were granted or declines as well as other factors.

A client can, by storing chunk requests from other clients (and also its own chunk requests), obtain at least a partial view of the state of the bandwidth limited resource. The system can also provide bit rate information such as but not limited to available bit rate, maximal allowed bit rate and the like.

The clients can approve, amend or reject a chunk request. The amendments may relate to the requested bit rate and not to the identity of the requested chunk.

Once a bit rate decision (bit rate allocation) is completed—the requesting client can be notified and according to the bit rate decisions—if approved send its own request to the media server or have the system send such a chunk request to the media server.

Thus, the clients can make a decision collaboratively and inform the clients that are allowed to send chunk requests—the allowed bit rate allocated for each client.

A client can, in response, generate a chunk request for a chunk known to the client and having a bit rate allocated as a result of the collaboration.

Yet according to another embodiment of the invention the system makes the bit rate decisions and notifies the clients which bit rates are allocated to the clients. A client, once receiving the allocated bit rate, can tailor its chunk request accordingly.

Yet according to another embodiment of the invention some clients can make bit rate decisions while other clients are not allowed to make such decisions. The selection of which clients can make such decisions can be determined based upon various criteria such as client priority, quality of service guaranteed to clients and the like. The selection can be fixed or change over time.

According to another embodiment of the invention the bit rate decisions are made by the system without notifying the clients about these decisions and especially not notifying the clients about the bit rate allocated to their requests.

For example, clients may send to the system chunk requests to obtain chunks. These chunk requests are received by the system. The system does not merely pass these chunk requests "as is" to the media streamer but rather can apply bit rate management control and send updated chunk requests to the media streamer.

The system may analyze the traffic on the bit rate limited resource and based upon the requests and the state of the bit rate limited resource generate new chunk requests, unchanged one or more chunk requests and the like.

A new chunk request can be generated by modifying or updating a chunk request or by creating a new chunk request with new or modified content.

The system then sends to the chunk requests to a media streamer. Thus—the new chunk requests are for the visual content (segments of the stream) as the original chunk requests but may request different bitrate versions than those which were in the original requests.

These new chunk requests are sent to the media sources that in turn provide the media chunks of a required bit rate to the clients—either via the system or while bypassing the system. If bypassing the system, the system should be aware of the transmissions over the bandwidth limited resource—it can monitor the traffic, and additionally or alternatively, can receive information from the media streamers about the transmitted traffic.

In any of the mentioned above embodiments the bit rate allocation between clients and additionally or alternatively, between services or flows, can be responsive to parameters such as: (i) video quality, (ii) user priority, (iii) operator priority, (iv) service (flow) priority; and (v) billing considerations.

Figure 2:
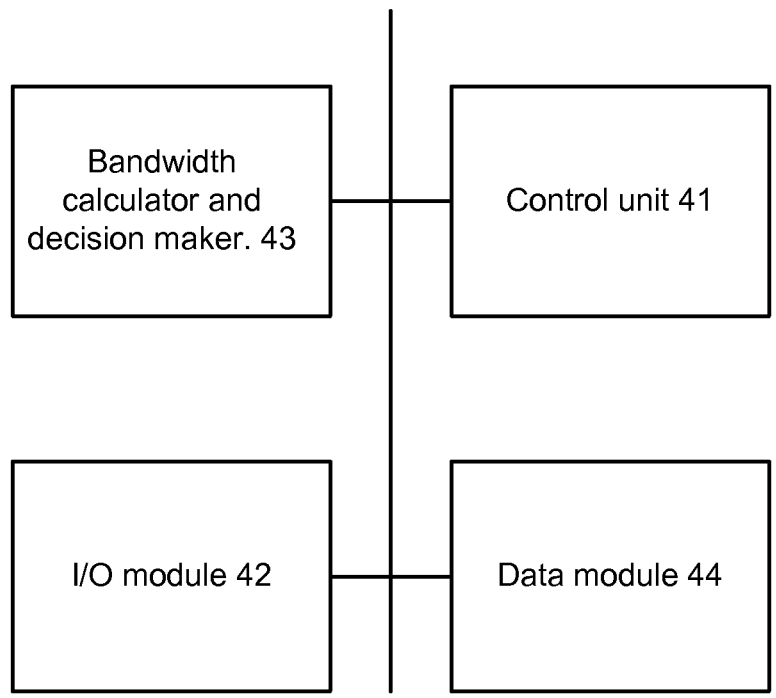
FIG. 2 illustrates a system according to an embodiment of the invention.

FIG. 2 illustrates a system 40 according to an embodiment of the invention. The system 40 includes:

a. An Input Output (I/O) module 42 that includes an input interface and an output interface. The I/O module 42 may be arranged to handle incoming and outgoing traffic including upstream chunk requests and downstream chunks.
b. A bandwidth calculator and decision maker (decision engine). The module 43 may be arranged to estimate the available bandwidth on the last mile channel and to make decisions regarding the amount of bit rate that can be allocated for each client. The decision engine can be a processing module or can be hosted by a processing module. The processing module can include hardware components.
c. A data module 44 that includes a parser that may create and parse relevant messages vis-à-vis the clients and the media streamers and
d. A control unit 41 that allocates resources among the modules of the system 40 and controls timing and similar issues.

It should be noted that other implementations are also possible including ones that include a module to represent each client separately, memory units and many other possibilities. Decision making can be based on many different approaches including some mentioned below.

The system 40 resides on the network side of the last mile channel 12, and has a visibility to all the requirements from the last mile channel 12. Therefore, the combined requests (including chunk requests and data transfer requests) for bit rates from the media streamers can be planned so that the transmission of media chunks and other flows do not exceed the available bit rate. This eliminates the problem of bit rate waste. In addition, the combined requests can be planned to fill the last mile channel as much as possible. This eliminates the problem of unused bit rate.

The system may be implemented within the architecture of any broadband provider such as mobile providers, HFC networks, DSL networks and any other type of network. In all cases, the system 40 may be implemented upstream from the client at the place that has full visibility of the bit rate limiting last mile channel.

Additionally or alternatively, the system may be implemented in a hierarchical fashion. For example, the system may be implemented in a residential gateway (or DSLAM) to manage different clients within the house and also in the Central Office to manage bit rates among different households.

It should be mentioned that the collaborative decisions can be achieved by one single process which manages all the client requests or by numerous processes, each one proxying one client, that negotiate among themselves.

Figure 3:
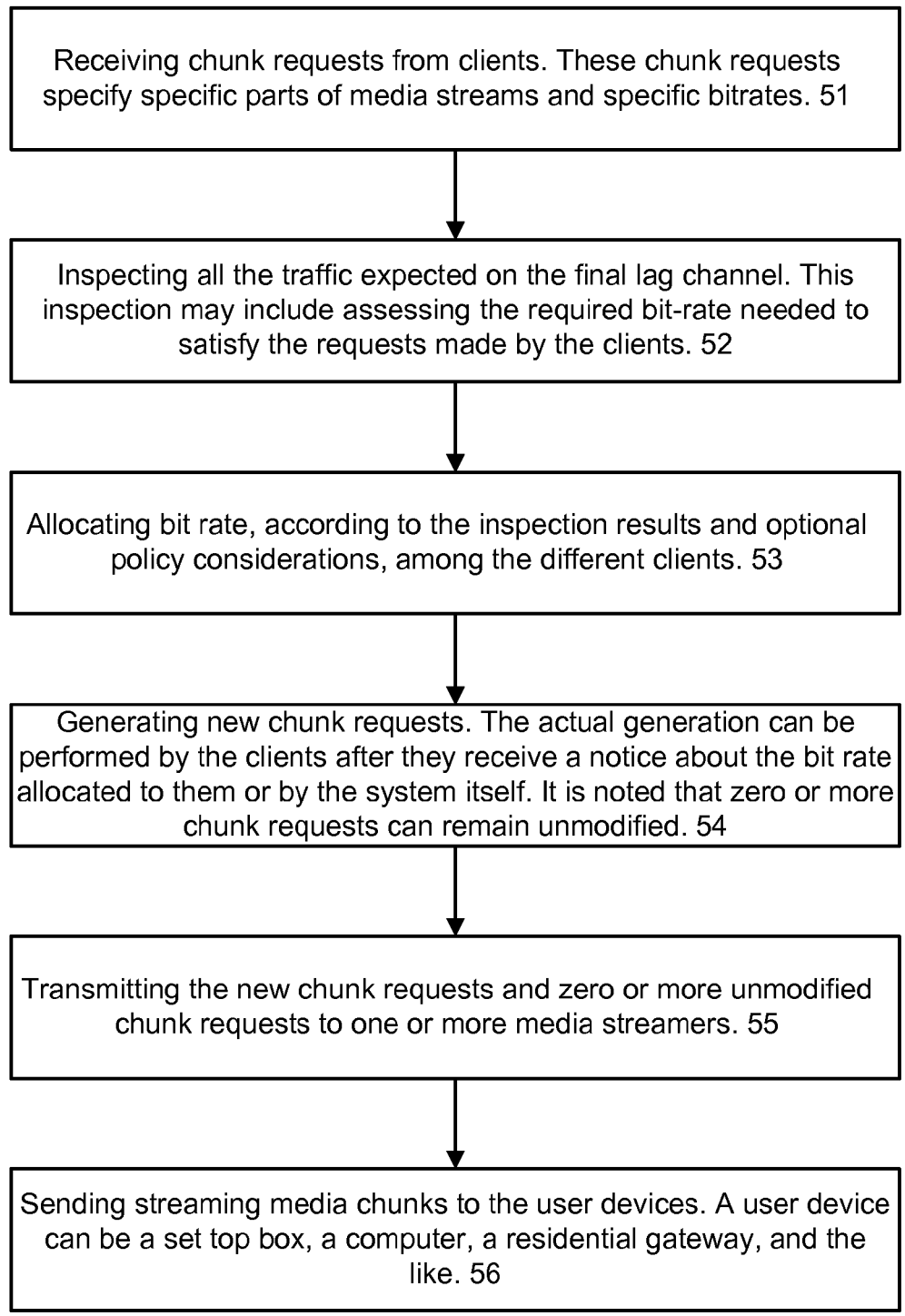
FIG. 3 illustrates a method according to an embodiment of the invention.

FIG. 3 illustrates method 50 according to an embodiment of the invention.

Method 50 starts by stage 51 of receiving chunk requests from clients. These chunk requests specify specific parts of media streams and specific bitrates.

Stage 51 is followed by stage 52 of inspecting all the traffic expected on the last mile channel. This inspection may include assessing the required bit-rate needed to satisfy the requests made by the clients.

Stage 52 is followed by stage 53 of allocating bit rate, according to the inspection results and optional policy considerations, among the different clients. The allocation should be as efficient as possible, taking into account all needed constraints (bit rate, cost, etc.). The allocation of bit rate includes indicating which bit rate version of a media stream should be provided to each client that generated an approved chunk request.

Stage 53 is followed by stage 54 of generating new chunk requests. The actual generation can be performed by the clients after they receive a notice about the bit rate allocated to them or by the system itself. It is noted that zero or more chunk requests can remain unmodified.

Stage 54 is followed by stage 55 of transmitting the new chunk requests and zero or more unmodified chunk requests to one or more media streamers.

Stage 55 may be followed by streaming the requested chunks to the user devices. This is reflected by stage 56 of sending streaming media chunks to the user devices. A user device can be a mobile device, a set top box, a computer, a residential gateway, and the like.

Figure 4:
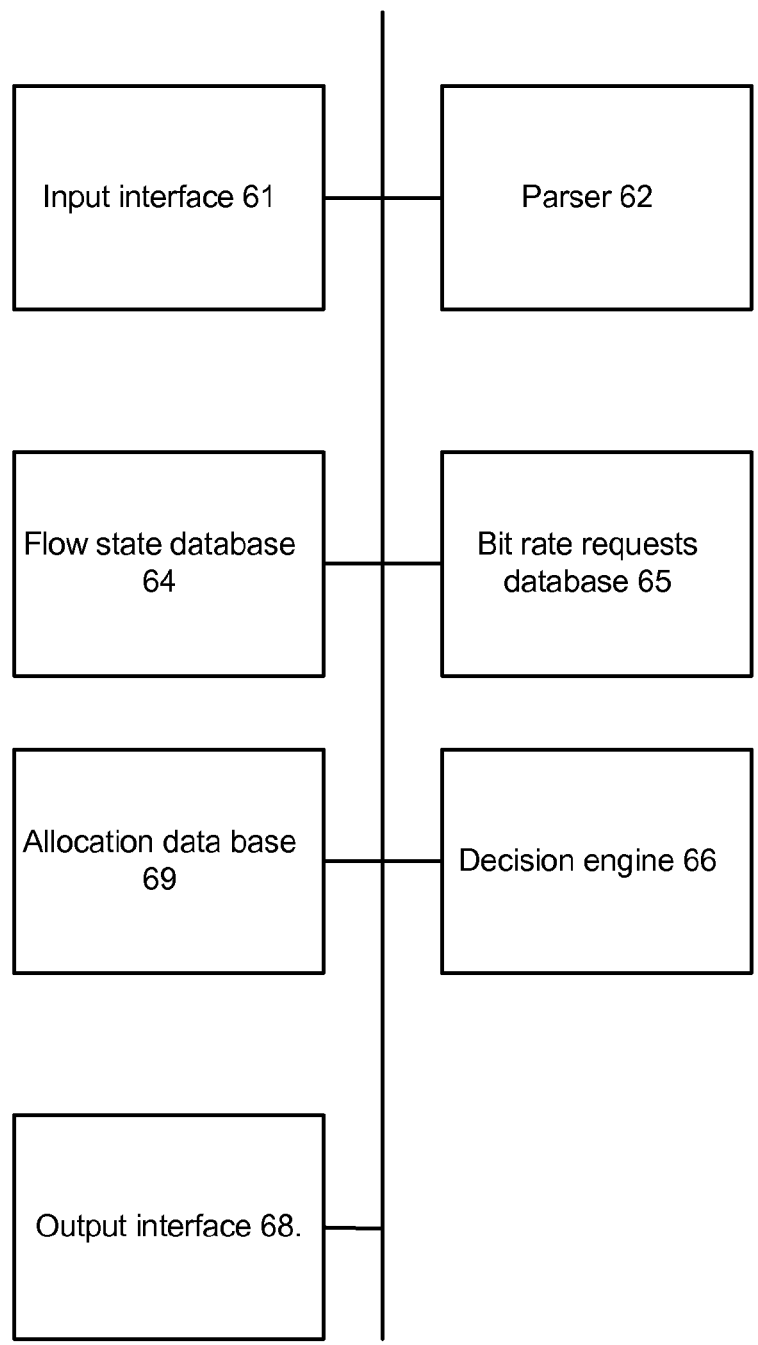
FIG. 4 illustrates a system according to an embodiment of the invention.

According to an embodiment of the invention a system 60 is provided. An embodiment of this system is illustrated in FIG. 4. The system receives information packets such as media packets that belong to media chunks (media flows) and control packets. Some of the control packets include chunk requests.

For simplicity of explanation the following description will refer to media packets and to chunk requests.

The system 60 includes an input interface 61, a parser 62, a flow state database 64, a bit rate requests database 65, an allocation data base 69, a decision engine 66 and an output interface 68.

The parser 62 parses incoming packets received by the input interface 60. Packets are classified as either control packets (such as chunk requests) or data packets (such as media packets).

Media packets or information representing media packets are used to update the flow state database 64. Control packets such as chunk requests or information representing the control packets are used to update the bit rate requests database 65. Both databases 64 and 65 provide a view of the bit rate utilization of the last mile channel and of requested bit rate for chunk requests—fulfilled chunk requests and those which were rejected or otherwise not fulfilled.

The allocation data base 69 stores the allocation of bit rates.

The decision engine 66 can access all databases and apply a bit rate control policy. It can, for example, generate new chunk requests that include fewer or more bit rate than requested by the client, and the like. According to another embodiment of the invention the decision engine 66 re-allocates bit rates and another entity amends the chunk requests based on the amended bit rate allocations. The decision engine can be a processing module or be hosted by a processing module.

According to an embodiment of the invention the flow state database 64 is used to track all the flows in last mile channel, track the utilization, identify related flows, such as consecutive segments of an ABR stream, identify significant changes in the state of the media flows that warrant a notification of the decision engine. Consecutive segments of an ABR stream can be the subject of different chunk requests that are sent by the same client. The client can send one or more chunk requests related to one or more media chunks even before the client received one or more previously requested media chunks, If these different chunk requests are both identified as being associated to the same media stream then the bit rate allocation can take this into account when comparing requested bit rates and allocated bit rates.

The decision engine 66 can be activated when pre-defined conditions are fulfilled such as more than a pre-defined change in the utilized bit rate, more than a pre-defined amount of newly requested bit rates, and the like. Alternatively, every chunk requests can be sent to the decision engine 66.

The decision engine 66 may allocate bit rates to flows and especially to media chunks.

According to an embodiment of the invention the decision engine 66 can distinguish between Available Bit Rate (ABR) flows and Progressive Download (PD) flows. It can allocate to each of these types of streaming media flows its own aggregate bit rate and apply the same bit rate control policy for both or apply different bit rate control policies for each.

In various streaming techniques the client is provided with media chunks even before it starts viewing these media chunks. This may prevent media viewing problems when the client is temporarily prevented from receiving the media or when the streaming to the client is otherwise limited due to various reasons. In case that the client decides not to view these media chunks, their transmission over the last mile channel results in a waste of bandwidth. In order to prevent this waste, the decision controller may delay the transmission of media packets from the media streamer. This can be done by delaying acknowledgement messages sent from the client (towards the media streamer) indicative of a reception of such packets. This policy can be applied, for example, on ABR chunks.

According to various embodiments of the invention the decision engine 66 can limit the amount of media chunks that are downloaded to a client so that if the client ends viewing a media stream before viewing all the media chunks that were downloaded to it—less media chunks will be wasted. The limitation can include delaying a transmission of acknowledgment messages to a media streamer, delaying a transmission of chunk requests and the like.

Figure 5:
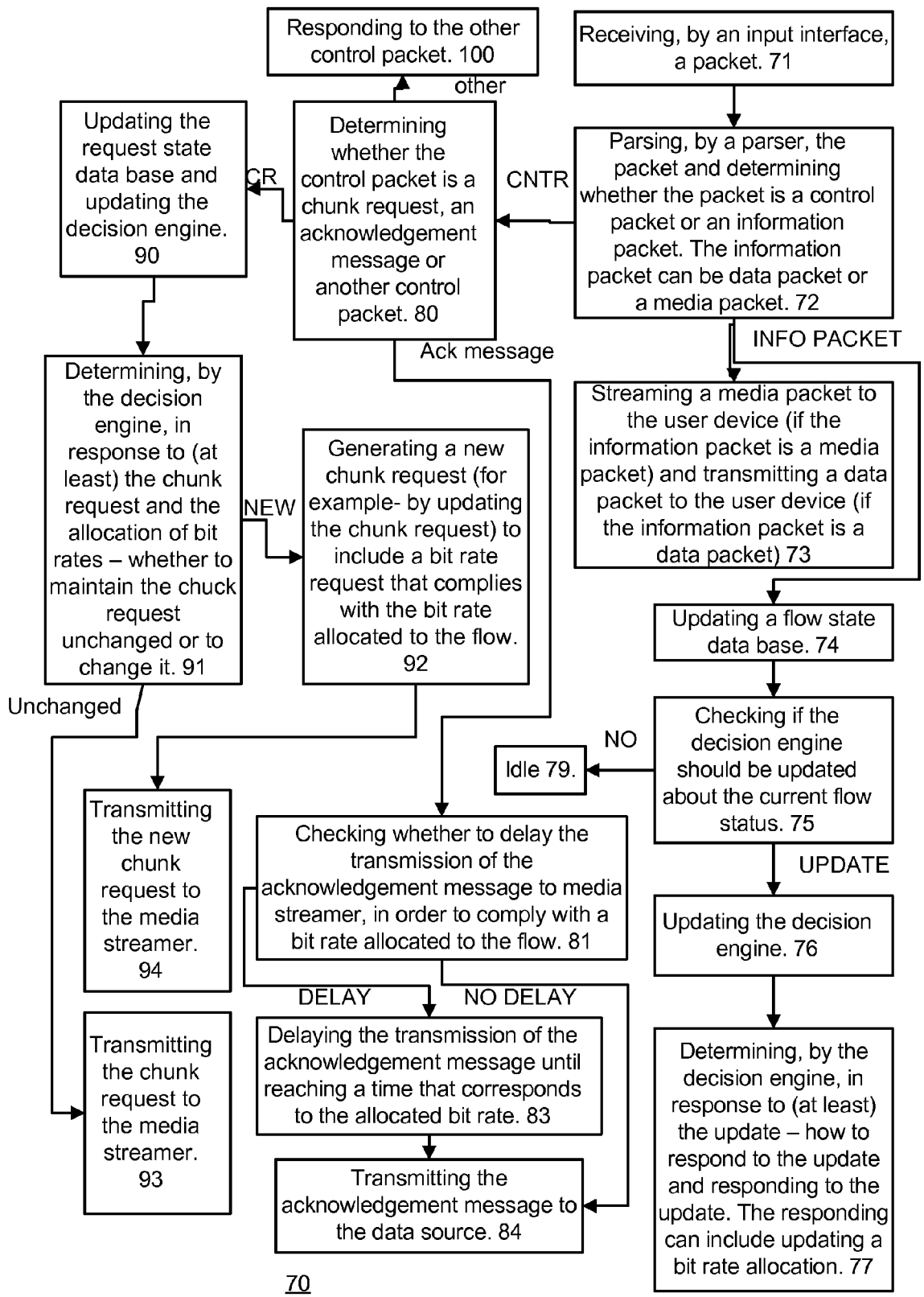
FIG. 5 illustrates a method according to an embodiment of the invention.

FIG. 5 illustrates method 70 for enforcing a bit rate allocation according to an embodiment of the invention.

Method 70 starts by stage 71 of receiving, by an input interface, a packet.

Stage 71 is followed by stage 72.

Stage 72 includes parsing, by a parser, the packet and determining whether the packet is a control packet or an information packet. The information packet can be data packet or a media packet.

If the packet is an information packet (INFO PACKET) then stage 72 is followed by stages 73 and 74.

If the packet is a control packet (CNTR) then stage 72 is followed by stage 80.

Stage 73 includes streaming a media packet to the user device (if the information packet is a media packet) and transmitting a data packet to the user device (if the information packet is a data packet). It is noted that according to some embodiments of the invention method 700 only addresses upstream traffic and does not participate in the downstream data path so that stage 73 may not be included in method 700.

Stage 74 includes updating a flow state data base. Thus the flow state data base may be updated to reflect the actual bit rate utilization.

Stage 74 may be followed by stage 75 of checking if the decision engine should be updated about the current flow status.

If the answer is positive (UPDATE) stage 74 is followed by stage 76, else (NO) stage 74 can jump to an idle stage 79.

The checking of stage 75 can include applying predefined conditions to this updating in order to provide a tradeoff between too many updates (that may consume too many computerized resources or communication resources) and fewer than desired updates (that may cause in sub-optimal allocation of bit rate). For example—the decision engine can be update per predefined period, per predefined amount of change in requested or utilized bit-rates, when a new user is added, when a new flow is added, when a user leaves or when a flow is terminated.

Stage 76 includes updating the decision engine.

Stage 76 is followed by stage 77 of determining, by the decision engine, in response to (at least) the update—how to respond to the update and responding to the update. The responding can include updating a bit rate allocation.

Stage 80 includes determining whether the control packet is a chunk request (CR), an acknowledgement message (Ack message) or another control packet (other).

If the control packet is an acknowledgement message then stage 80 is followed by stage 81.

If the control packet is a chunk request then stage 80 is followed by stage 90.

Else (another control packet) stage 80 is followed by stage 100 of responding to the other control packet.

Stage 81 includes checking whether to delay the transmission of the acknowledgement message to media streamer, in order to comply with a bit rate allocated to the flow. Delay may be required if the allocated bit rate mandates a certain period (or a certain range of periods) between consecutive transmissions of acknowledgement messages.

If the answer is positive (DELAY) then stage 81 is followed by stage 83 of delaying the transmission of the acknowledgement message until reaching a time that corresponds to the allocated bit rate. The period between consecutive transmissions of acknowledgement messages may reflect the allocated bit rate. If, for example, each acknowledgment message is followed by a streaming of X bits and the allocation of bit rate is Y bits per second than the delay can be substantially equal to X/Y seconds. If the answer is negative (NO DELAY) than stage 81 is followed by stage 84.

Stage 83 is followed by stage 84 of transmitting the acknowledgement message to the data source.

Stage 81 and 83 can be executed by a protocol manipulator (such as a HTTP manipulator) that may access the decision engine or the allocation data base and determine the allocated bit rate for the flow that is related to the acknowledgement message.

Stage 90 includes updating the request state data base and updating the decision engine.

Stage 90 is followed by stage 91 of determining, by the decision engine, in response to (at least) the chunk request and the allocation of bit rates—whether to maintain the chunk request unchanged or to change it. If determining to update the chunk request (NEW) then stage 91 is followed by stage 92 else (Unchanged) it is followed by stage 94 of transmitting the chunk request to a media streamer. The determination can include comparing between the bit rate requested by the chunk request and the allocated bit rate. If, for example, the allocated bit rate matches the requested but rate then the chunk request can remain unchanged. If there is a mismatch between the allocated bit rate and the requested bit rate (Requested by the chunk request) then the decision engine can determine to adapt the requested bit rate to the allocated bit rate. It is noted that decision engine may ignore small (insignificant) changes.

Stage 92 includes generating a new chunk request (for example—by updating the chunk request) to include a bit rate request that complies with the bit rate allocated to the flow.

Stage 92 is followed by stage 93 of transmitting the new chunk request to the media streamer.

A non-limiting example of a bit rate control policy is provided below:

A maximal allowable aggregate bit rate for transmitting video chunks (or all types) is defined—$T_{BR}$.

A maximal allowable bit rate for high priority users ($PU_{BR}$) may be defined.

A maximal allowable aggregate bit rate for transmission of BD media chunks and ABR media chunks are defined—$PD_{BR}$ and $ABR_{BR}$.

The maximal allowable aggregate bits rates for each type of media can be a fraction of $TABR_{max}$. For example $ABR_{BR}$ can equal 80% of $TABR_{max}$. ABR manifest files include a description all the possible bit rates for a stream. TABRmax is the sum of the possible maximums of the available streams.

After allocating bit rates for media chunks, the remaining bit rate for data transmission ($D_{BR}$) can be calculated by:

$$D_{BR}=(T_{BR}-PU_{BR}-PD_{BR}-ABR_{BR})*Factor$$

The Factor is used to maintain some threshold below congestion.

Different bit rates can be allocated to different data flows although different data flows can be allocated the same bit rate. In the latter case—each data flow can be allocated with $F_{BR}=(D_{BR}/\text{number of data flows})$.

According to an embodiment of the invention the bit rate allocation parameters (bit rates, factor) can be re-calculated when at least one of the following events occurs:

a. New flows
b. Closing of flows
c. Change of reception conditions
d. Anticipation of events (hand-ins, hand-outs, etc.).

The following tables will illustrate an example of a bit rate control scheme.

Tables 1 and 2 illustrate an initial state of the system and bit rate allocations for different users.

TABLE 1

| Maximal allowable aggregate bit rate | $PD_{BR}$ | Number of PD flows | $ABR_{BR}$ | Number of ABR flows | Number of data flows |
|---|---|---|---|---|---|
| 4500 kbps | 800 kbps | 1 | 2100 kbps | 3 | 6 |

TABLE 2

| User | Flow ID | Flow type | Allocated bit rate (kbps) |
|---|---|---|---|
| User A | Flow 1 | Data | 250 |
| User B | Flow 2 | PD | 800 |
| User C | Flow 3 | ABR | 400 |
| User D | Flow 4 | ABR | 850 |
| User E | Flow 5 | ABR | 850 |
| User A | Flow 6 | Data | 250 |
| User F | Flow 7 | Data | 250 |

TABLE 2-continued

| User | Flow ID | Flow type | Allocated bit rate (kbps) |
|---|---|---|---|
| User G | Flow 8 | Data | 250 |
| User H | Flow 9 | Data | 250 |
| User I | Flow 10 | Data | 250 |

At this initial state user F sends an acknowledgement message for a media packet of flow 7 he receives. The system may delay the transmission of the acknowledgement message in order to maintain the bit rate allocation—to 250 kbps.

After a while user B sends an acknowledgement message for a media packet of flow 2 he receives. The system may delay the transmission of the acknowledgement message in order to maintain the bit rate allocation—to 800 kbps.

After those events the decision engine decided to change the allocation of bit rates to users D and C—the bit rate allocation to flow 4 of user D is reduced from 850 kpbs to 400 kbps and to increase the bit rate allocation of flow 3 of user C from 400 to 850 kbps. The decision can be responsive to various reasons including but not limited to quality issues.

This change may include first reducing the bit rate allocation to user D and then increasing the bit rate allocation of user C. This order may prevent congestion. It is noted that if there is not risk of congestion (for example—when the order of the increment and decrement of bit rates will not cause congestions)—then the order can be reversed.

Table 3 illustrates this new state:

TABLE 3

| User | Flow ID | Flow type | Allocated bit rate (kbps) |
|---|---|---|---|
| User A | Flow 1 | Data | 250 |
| User B | Flow 2 | PD | 800 |
| User C | Flow 3 | ABR | 850 |
| User D | Flow 4 | ABR | 400 |
| User E | Flow 5 | ABR | 850 |
| User A | Flow 6 | Data | 250 |
| User F | Flow 7 | Data | 250 |
| User G | Flow 8 | Data | 250 |
| User H | Flow 9 | Data | 250 |
| User I | Flow 10 | Data | 250 |

After a while user D sends a chunk request and the system changes the bit rate associated with the video chunk to 400 bps—if the request (prior the change of bit rate allocation) requested more than 400 bps.

After a while user C sends a chunk request and the system changes the bit rate associated with the video chunk to 850 bps—if the request (prior the change of bit rate allocation) requested less than 850 bps (or more than 850 bps).

After a while a new user is added—user J and a new flow (flow 11) is also added. This will result in a change in both status tables, as illustrated by tables 4 and 5:

TABLE 4

| Maximal allowable aggregate bit rate | $PD_{BR}$ | Number of PD flows | $ABR_{BR}$ | Number of ABR flows | Number of data flows |
|---|---|---|---|---|---|
| 4500 kbps | 800 kbps | 1 | 2800 kbps | 4 | 6 |

TABLE 5

| User | Flow ID | Flow type | Allocated bit rate (kbps) |
|---|---|---|---|
| User A | Flow 1 | Data | 250 |
| User B | Flow 2 | PD | 800 |
| User C | Flow 3 | ABR | 850 |
| User D | Flow 4 | ABR | 400 |
| User E | Flow 5 | ABR | 850 |
| User A | Flow 6 | Data | 250 |
| User F | Flow 7 | Data | 250 |
| User G | Flow 8 | Data | 250 |
| User H | Flow 9 | Data | 250 |
| User I | Flow 10 | Data | 250 |
| User J | Flow 11 | ABR | 400 |

Although the ABR for User J is 850 kbps—only 700 kbps were added to ABRbr of table 4 according to TABRmax. Only 400 kpbs were allocated to flow 11 (in table 5) because in the example, the manifest stated that the next (after 400 kbps) bitrate level is 850 kbps and this may be too high.

After a while user J sends a chunk request for flow 11 and the system changes the bit rate associated with the video chunk to 400 bps—if the request (prior the change of bit rate allocation) requested more than 850 bps.

After a while user A sends an acknowledgement message for data flow 1 he receives. The system may delay the transmission of the acknowledgement message in order to maintain the bit rate allocation—to 150 kbps.

Figure 6:
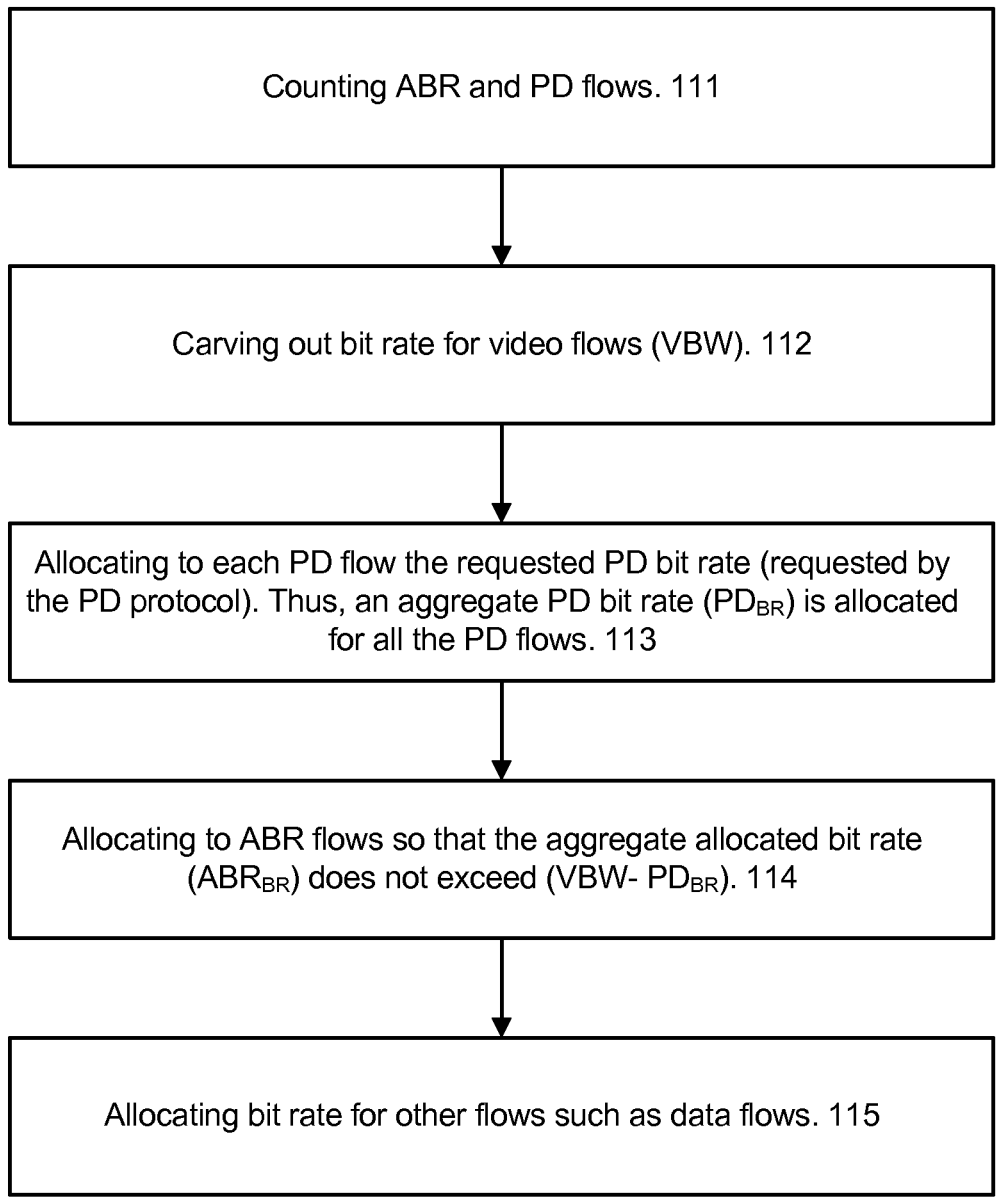
FIG. 6 illustrates a method according to an embodiment of the invention.

FIG. 6 illustrates method 110 for bit rate allocation according to an embodiment of the invention.

Method 110 includes a sequence of stages 111, 112, 113, 114 and 115.

Stage 111 includes counting ABR and PD flows.

Stage 112 includes carving out bit rate for video flows (VBW).

Stage 113 includes allocating to each PD flow the requested PD bit rate (requested by the PD protocol). Thus, an aggregate PD bit rate ($PD_{BR}$) is allocated for all the PD flows.

Stage 114 includes allocating to ABR flows so that the aggregate allocated bit rate ($ABR_{BR}$) does not exceed (VBW-$PD_{BR}$). The allocation between different ABR flows can be responsive to quality considerations—lower quality flows can receive more bit rate.

Stage 115 includes allocating bit rates for other flows such as data flows.

According to an embodiment of the invention method 110 also includes an initialization stage 119 that include allocating bit rate for premium users. Stage 119 may precede stage 111.

According to an embodiment of the invention the control packets do not include chunk requests or acknowledgement messages but rather include commands that relate to other network functions and the chunk requests and acknowledgement messages can be categorized to information packets. In this case the mentioned above methods and system should classify information packets to a plurality of classes—including acknowledgement messages and chunk requests and process these requests as mentioned above. A non-limiting example of a network that perform a different classification includes a wireless network in which control signals can include requests to perform a handoff between cells, and the like.

Any of the methods mentioned above can be executed by a computer that executed instructions stored in a non-transitory computer readable medium of a computer program product. The computer readable medium can be a diskette, a tape, a disk, a memory chip, a compact disk and the like. It can be read by using electro-magnetic manners, electrical signals, light beams, magnetic fields and the like.

Any combination of any methods (or any stages or any method) can be provided. One or more non-transitory computer readable mediums can store instructions for any combination of any stage or any method (or of any method).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for controlling streaming media flows, the method comprising:
    allocating or receiving allocated bit rates to a plurality of streaming media flows, each streaming media flow comprises a plurality of chunks and is expected to flow over a last mile channel that is bandwidth limited;
    receiving, by a system, a plurality of chunk requests from clients that are hosted on user devices, each chunk request indicates a requested bit rate for streaming a media chunk that belongs to the streaming media flow; wherein the last mile channel is located downstream to the system;
    changing, by the system, at least one chunk request to comply with an allocated bit rate, when the requested bit rate does not comply with the allocated bit rate, to provide at least one new chunk request; wherein the changing of the at least chunk request is performed without notifying at least client that is associated with the at least one chunk request; and
    sending the at least one new chunk request to a media streamer that is expected to stream the streaming media flow to a user device of the user devices.

2. The method according to claim 1, wherein the media streamer is unaware of a stage of the last mile channel.

3. The method according to claim 1, comprising: receiving an acknowledgement message from a certain client, the acknowledgement message is indicative of a reception of a media chunk; and delaying a transmission of the acknowledgement message to the media streamer, wherein the delaying is responsive to a number of chunks of a media stream that were received by the certain client and are pending to be displayed to a user of a certain user device that hosts the certain client.

4. The method according to claim 3 comprising concealing from the certain client the delaying of the transmission of the acknowledgement message.

5. The method according to claim 1, comprising allocating the allocated bit rate to each of the streaming media flows by a system that is coupled to last mile channel.

6. The method according to claim 1, comprising allocating the allocated bit rate to the streaming media flows by collaboration between the clients.

7. The method according to claim 1, comprising allocating the allocated bit rates to the streaming media flows by utilizing client proxies that are hosted on a system that is coupled to the last mile channel.

8. The method according to claim 1, comprising allocating the allocated bit rates based upon quality levels of the streaming media flows.

9. The method according to claim 1, comprising:
    not changing file requests that are associated with a first type of streaming media flows;
    changing chunk requests to comply with allocated bit rates if the chunk requests are associated with a second type of streaming media flows and when requested bit rates do not comply with the allocated bit rates to provide new chunk requests; and sending unchanged chunk requests and new chunk requests to at least one media streamer that is expected to stream the streaming media flows to the user devices.

10. The method according to claim 9, wherein the first type of streaming media flows is a progressive download.

11. The method according to claim 9, wherein the second type of streaming media flows is an adaptive bit rate flow.

12. The method according to claim 1, comprising allocating the allocated bit rate to the streaming media flows by collaboration between the clients.

13. The method according to claim 1, comprising allocating the allocated bit rates to the streaming media flows by utilizing client proxies on a system that is coupled to the last mile channel.

14. The method according to claim 1 comprising enforcing different bit rate control policies to different types of streaming media flows.

15. The method according to claim 1 wherein the last mile channel is a wired channel.

16. The method according to claim 1 wherein the last mile channel is a wireless channel.

17. The method according to claim 1, wherein an allocated bit rate of the allocated bit rates is a predetermined portion of a maximal allowable bit rate of the streaming media flow.

18. The method according to claim 1, wherein an allocated bit rate of the allocated bit rates is an 80% of a maximal allowable bit rate of the streaming media flow.

19. The method according to claim 1, comprising allocating the allocated bit rates to the streaming media flows.

20. The method according to claim 1, comprising receiving the allocated bit rates to the streaming media flows.

21. The method according to claim 1, comprising executing the allocating by a system that is coupled between the media streamer and the last mile channel.

22. A system comprising:
an input interface arranged to receive a plurality of chunk requests from clients that are hosted on user devices, each chunk request indicates a requested bit rate for streaming a media chunk that belongs to the streaming media flow;
a processing module that is arranged to:
allocate or receive allocated bit rates to a plurality of streaming media flows, each streaming media flow comprises a plurality of chunks and is expected to flow over a last mile channel that is bandwidth limited; wherein the last mile channel is located downstream to the system;
change at least one chunk request to comply with an allocated bit rate, when the requested bit rate does not comply with the allocated bit rate, to provide at least one new chunk request; wherein the change of the at least chunk request is performed without notifying at least client that is associated with the at least one chunk request; and
an output interface arranged to send the at least one new chunk request to a media streamer that is expected to stream the streaming media flow to a user device of the user devices.

23. The system according to claim 22, wherein the media streamer is unaware of a stage of the last mile channel.

24. The system according to claim 22, wherein the input interface is arranged to receive an acknowledgement message from a client, the acknowledgement message is indicative of a reception of a media chunk; and wherein an output interface of the system is arranged to delay the transmission of the acknowledgement message, wherein the delay is responsive to a number of chunks of a media stream that that were received by the certain client and are pending to be displayed to a user of a certain user device that hosts the certain client.

25. The system according to claim 24 wherein the system is configured to conceal from the certain client the delaying of the transmission of the acknowledgement message.

26. The system according to claim 22, wherein the processing module is arranged to allocate the allocated bit rate to each of the streaming media flows by a system that is coupled to last mile channel.

27. The system according to claim 22, wherein the processing module is arranged to allocate the allocated bit rate to the streaming media flows by collaboration between the clients.

28. The system according to claim 22, wherein the processing module is arranged to allocate the allocated bit rates to the streaming media flows by utilizing client proxies that are hosted by the system.

29. The system according to claim 22, wherein the processing module is arranged to allocate the allocated bit rates based upon quality levels of the streaming media flows.

30. The system according to claim 22, wherein the processing module is arranged to not change file requests that are associated with a first type of streaming media flows; change chunk requests to comply with allocated bit rates when the chunk requests are associated with a second type of streaming media flows and if requested bit rates do not comply with the allocated bit rates to provide new chunk requests; and wherein an output interface of the system is arranged to send unchanged chunk requests and new chunk requests to at least one media streamer that is expected to stream the streaming media flows to the user devices.

31. The system according to claim 30, wherein the first type of streaming media flows is a progressive download.

32. The system according to claim 30, wherein the second type of streaming media flows is an adaptive bit rate flow.

33. The system according to claim 22, wherein the processing module is arranged to allocate the allocated bit rate to the streaming media flows by collaboration between the clients.

34. The system according to claim 22, wherein the processing module is arranged to allocate the allocated bit rates to the streaming media flows by utilizing client proxies on a system that is coupled to the last mile channel.

35. The system according to claim 22 wherein the processing module is arranged to enforce different bit rate control policies to different types of streaming media flows.

36. The system according to claim 22 wherein the last mile channel is a wired channel.

37. The system according to claim 22 wherein the last mile channel is a wireless channel.

38. The system according to claim 22, wherein an allocated bit rate is a predetermined portion of a maximal allowable bit rate of the streaming media flow.

39. The system according to claim 22, wherein an allocated bit rate is an 80% of a maximal allowable bit rate of the streaming media flow.

40. The system according to claim 22, wherein the processing module is arranged to allocate the allocated bit rates to the streaming media flows.

41. The system according to claim 22, wherein the processing module is arranged to receive the allocated bit rates to the streaming media flows.

42. The system according to claim 22, wherein the system is coupled between the media streamer and the last mile channel.

43. A computer program product that comprises a non-transitory computer readable medium that stores instructions for:

allocating or receiving allocated bit rates to a plurality of streaming media flows, each streaming media flow comprises a plurality of chunks and is expected to flow over a last mile channel that is bandwidth limited; wherein the last mile channel is located downstream to the system;

receiving a plurality of chunk requests from clients that are hosted on user devices, each chunk request indicates a requested bit rate for streaming a media chunk that belongs to the streaming media flow;

changing at least one chunk request to comply with an allocated bit rate, if the requested bit rate does not comply with the allocated bit rate, to provide at least one new chunk request;

wherein the changing of the at least chunk request is performed without notifying at least client that is associated with the at least one chunk request; and sending the at least one new chunk request to a media streamer that is expected to stream the streaming media flow to the user device.

44. The computer program product according to claim 43, wherein the media streamer is unaware of a stage of the last mile channel.

45. The computer program product according to claim 43, wherein the non-transitory computer readable medium stores instructions for receiving an acknowledgement message from a client, the acknowledgement message is indicative of a reception of a media chunk and delaying the transmission of the acknowledgement message, wherein the delay is responsive to a number of chunks of a media stream that that were received by the certain client and are pending to be displayed to a user of a certain user device that hosts the certain client.

46. The computer program product according to claim 45 wherein the non-transitory computer readable medium stores stores instructions for concealing from the certain client the delaying of the transmission of the acknowledgement message.

47. The computer program product according to claim 43, wherein the non-transitory computer readable medium stores instructions for allocating the allocated bit rate to each of the streaming media flows by a system that is coupled to last mile channel.

48. The computer program product according to claim 43, wherein the non-transitory computer readable medium stores instructions for allocating the allocated bit rates to the streaming media flows by a collaboration between the clients.

49. The computer program product according to claim 43, wherein the non-transitory computer readable medium stores instructions for allocating the allocated bit rates to the streaming media flows by utilizing client proxies that are hosted by a system that is coupled to the last mile channel.

50. The computer program product according to claim 43, wherein the non-transitory computer readable medium stores instructions for allocating the allocated bit rates based upon quality levels of the streaming media flows.

51. The computer program product according to claim 43, wherein the non-transitory computer readable medium stores instructions for:

maintaining file requests unchanged if the file requests are associated with a first type of streaming media flows;

changing chunk requests to comply with allocated bit rates if the chunk requests are associated with a second type of streaming media flows and if requested bit rates do not comply with the allocated bit rates to provide new chunk requests; and sending unchanged chunk requests and new chunk requests to at least one media streamer that is expected to stream the streaming media flows to the user devices.

52. The computer program product according to claim 51, wherein the first type of streaming media flows is a progressive download.

53. The computer program product according to claim 51, wherein the second type of streaming media flows is an adaptive bit rate flow.

54. The computer program product according to claim 43, wherein the non-transitory computer readable medium stores instructions for allocating the allocated bit rates to the streaming media flows by collaboration between the clients.

55. The computer program product according to claim 43, wherein the non-transitory computer readable medium stores instructions for allocating the allocated bit rates to the streaming media flows by utilizing client proxies on a system that is coupled to the last mile channel.

56. The computer program product according to claim 43, wherein the non-transitory computer readable medium stores instructions for enforcing different bit rate control policies to different types of streaming media flows.

57. The computer program product according to claim 43, wherein the last mile channel is a wired channel.

58. The computer program product according to claim 43, wherein the last mile channel is a wireless channel.

59. The computer program product according to claim 43, wherein the non-transitory computer readable medium stores instructions for determining an allocated bit rate of the allocated bit rates as a predetermined portion of a maximal allowable bit rate of the streaming media flow.

60. The computer program product according to claim 43, wherein an allocated bit rate of the allocated bit rates as an 80% of a maximal allowable bit rate of the streaming media flow.

61. The computer program product according to claim 43, wherein the non-transitory computer readable medium stores instructions for allocating the allocated bit rates to the streaming media flows.

62. The computer program product according to claim 43, wherein the non-transitory computer readable medium stores instructions for receiving the allocated bit rate to the streaming media flow.

* * * * *